(12) United States Patent
Sun et al.

(10) Patent No.: US 12,222,603 B2
(45) Date of Patent: Feb. 11, 2025

(54) DISPLAY MODULE STRUCTURE AND DISPLAY DEVICE

(71) Applicant: Wuhan China Star Optoelectronics Technology Co., Ltd., Wuhan (CN)

(72) Inventors: Nongyun Sun, Wuhan (CN); Zheng Zhou, Hubei (CN); Suimang Song, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/622,469

(22) PCT Filed: Dec. 17, 2021

(86) PCT No.: PCT/CN2021/139207
§ 371 (c)(1),
(2) Date: Dec. 25, 2023

(87) PCT Pub. No.: WO2023/103043
PCT Pub. Date: Jun. 15, 2023

(65) Prior Publication Data
US 2024/0111187 A1    Apr. 4, 2024

(30) Foreign Application Priority Data

Dec. 9, 2021 (CN) .......................... 202111517557.9

(51) Int. Cl.
| G02F 1/13357 | (2006.01) |
| G02F 1/1333 | (2006.01) |
| G02F 1/1335 | (2006.01) |

(52) U.S. Cl.
CPC .. *G02F 1/133608* (2013.01); *G02F 1/133308* (2013.01); *G02F 1/133524* (2013.01)

(58) Field of Classification Search
CPC ......... G02F 1/133608; G02F 1/133308; G02F 1/133524
See application file for complete search history.

(56) References Cited

FOREIGN PATENT DOCUMENTS

| CN | 101943375 A | 1/2011 |
| CN | 103591556 A | 2/2014 |
| CN | 203519965 U | 4/2014 |
| CN | 104235698 A | 12/2014 |

(Continued)

OTHER PUBLICATIONS

International Search Report in International application No. PCT/CN2021/139207, mailed on Sep. 2, 2022.

(Continued)

*Primary Examiner* — Lucy P Chien
(74) *Attorney, Agent, or Firm* — PV IP PC; Wei Te Chung

(57) ABSTRACT

A display module structure and a display device are provided. The display module structure includes a support plate and a frame. The support plate includes a first interference member disposed on an interference surface and a support surface configured for disposition of an optical assembly. The support surface is located at a vertical level higher than a vertical level of the first interference member. The first interference portion and the first interference member are fastened with each other to fix the frame to the support plate, so that a width of a side portion of the display module structure can be reduced.

14 Claims, 4 Drawing Sheets

(56) References Cited

FOREIGN PATENT DOCUMENTS

| | | |
|---|---|---|
| CN | 104267522 A | 1/2015 |
| CN | 104536182 A | 4/2015 |
| CN | 206684439 U | 11/2017 |
| CN | 108303826 A | 7/2018 |
| CN | 109283724 A | 1/2019 |
| CN | 111679504 A | 9/2020 |
| JP | 2008233153 A | 10/2008 |
| TW | 201005384 A | 2/2010 |

OTHER PUBLICATIONS

Written Opinion of the International Search Authority in International application No. PCT/CN2021/139207, mailed on Sep. 2, 2022.

Chinese Office Action issued in corresponding Chinese Patent Application No. 202111517557.9 dated Jan. 5, 2023, pp. 1-7.

DISPLAY MODULE STRUCTURE AND DISPLAY DEVICE

CROSS-REFERENCE TO RELATED APPLICATION

This application is a national phase application under 35 U.S.C. § 371 of PCT Application No. PCT/CN2021/139207, filed Dec. 17, 2021, which claims priority to Chinese Application No. 202111517557.9, filed Dec. 9, 2021, the contents of which are incorporated herein by reference in their entirety.

FIELD OF INVENTION

The present invention relates to a technical field of displays, and particularly to a display module structure and a display device.

RELATED ART

With development of display technologies, flat display devices (for example, liquid crystal display devices or organic light-emitting display devices) have been widely used in various electronic products, such as mobile phones, notebook computers, televisions, and in-vehicle display devices due to their advantages of high image quality, small size, being light in weight, etc.

With the development of display technologies and changes in user needs, users have higher and higher requirements for the performance and appearance of displays. In particular, frame widths of display panels are required to be as small as possible, because modules with narrower bezels can achieve a superior frame visual effect. For vehicles with limited internal space, display devices with narrow bezels have become the first choice of most of car companies and consumers. FIG. 1 is a schematic conventional display module 9, which is, for example, an in-vehicle display module. As shown in FIG. 1, a side portion of the conventional display module 9 is formed by a fastening structure of side walls of a sheet metal 91 and a frame 92. Since the conventional sheet metal 91 must be bent and stamped to form an assembled structure, the side portion of the assembled display module 9 is thicker, and therefore the frame is wider. Specifically, the side portion of the conventional in-vehicle display module 9 includes a thickness T1 of the sheet metal 91 and a thickness T2 of the frame 92, which greatly increases the width of the frame; additionally, since the conventional sheet metal 91 must be bent and stamped to form a placing space 90 for optical modules, the bending of the sheet metal 91 will increase the required space, which is not conducive to the space arrangement of the display device. Furthermore, since enough room for expansion and contraction should be reserved for optical films, the overall traditional frame design requires more space, giving rise to poor visual effects of the frame, which is not conducive to the narrow bezel design.

SUMMARY OF INVENTION

An object of the present invention is to provide a display module structure and a display device to overcome a problem that a frame side portion of a traditional display module is composed of a two-layered structure, resulting in an increase in a thickness of the frame side portion, reducing available space inside the display module, which is not conducive to a narrow bezel design.

Technical Solution

To achieve the above-mentioned object, the present application provides a technical solution as follows:

The present application provides a display module structure, configured to support an optical assembly, comprising a support plate comprising a support surface, a bottom surface, an interference surface connected between the support surface and the bottom surface, and at least one first interference member. The support surface is configured for disposition of the optical assembly, the first interference member is disposed on the interference surface, and the support surface is located at a vertical level higher than a vertical level of the first interference member; and a frame comprising a retaining wall and at least a first interference portion arranged on the retaining wall, the retaining wall disposed around the support plate, and the first interference portion and the first interference member are fastened with each other to fix the frame to the support plate.

Optionally, the support plate further comprises a groove recessed from the interference surface, and the first interference member is located in the groove and protrudes out of the interference surface, wherein the first interference portion of the frame is located at a bottom edge of the retaining wall and extends in a direction toward the first interference member and comprises an engaging slot and a limiting wall surrounding the engaging slot, wherein the engaging slot engages with the first interference member.

Optionally, an outer surface of the limiting wall is located in the groove, and the limiting wall comprises a guiding edge disposed at a corner of the limiting wall close to the interference surface, wherein the guiding edge is an oblique surface or a curved surface.

Optionally, the support plate further comprises at least a second interference member spaced apart from the first interference member and located under the bottom edge of the retaining wall, and the frame further comprises at least a second interference portion arranged on the retaining wall and fastened with the second interference member.

Optionally, the second interference member comprises an insertion slot, and the second interference portion is disposed on the bottom edge of the retaining wall and extends in a direction toward the second interference member, wherein the insertion slot penetrates the support surface of the support plate and comprises two opposite interfering inner walls, and the second interference portion is provided with fitting walls corresponding to and engaging with the interfering inner walls.

Optionally, an extension slot is disposed at a bottom of the insertion slot, and both ends of the extension slot extend outside the interfering inner walls, respectively, wherein each of the fitting walls is provided with a hook corresponding to the extension slot to be fastened in the extension slot.

Optionally, the display module structure further comprises a bound edge adhesive, wherein a recessed portion is disposed on an outer surface of the frame corresponding to the first interference portion, and the bound edge adhesive is arranged along the recessed portion and extends to a bottom surface of the support plate, so that the first interference member and the first interference portion are covered by the bound edge adhesive.

Optionally, a cantilever is disposed on one side of the retaining wall facing the optical assembly and is parallel with the support surface, and an orthographic projection of the cantilever on a horizontal plane is completely located on the support surface, wherein the optical assembly is arranged between the cantilever and the support surface.

Optionally, the bottom edge of the retaining wall of the frame abuts against the support surface of the support plate and forms an accommodating space with the support surface, and the optical assembly is disposed in the accommodating space, wherein the optical assembly comprises a light-emitting device.

The present application further provides a display device, comprising a liquid crystal display panel and a display module structure, the display module structure configured to support an optical assembly, the optical assembly comprising a light-emitting device for providing a light source for the liquid crystal display panel, wherein the display module structure comprises a support plate comprising a support surface, a bottom surface, an interference surface connected between the support surface and the bottom surface, and at least one first interference member, wherein the support surface is configured for disposition of the optical assembly, the first interference member is disposed on the interference surface, and the support surface is located at a vertical level higher than a vertical level of the first interference member; and a frame comprising a retaining wall and at least a first interference portion arranged on the retaining wall, the retaining wall disposed around the support plate, and the first interference portion and the first interference member are fastened with each other to fix the frame to the support plate.

Advantageous Effect

The present application has advantageous effects as follows: the application provides the display module structure and the display device. In the display module structure, by providing the first interference member formed on the interference surface (i.e., a side surface) of the support plate, and by providing the support surface located above the first interference member through the aluminum casting process, the support plate does not need to be bent to form the first interference member for being fastened with the first interference portion of the frame, so that the support surface is in direct contact with the frame, thereby solving the problem that a frame side portion of a traditional display module is composed of a two-layered structure, resulting in an increase in a thickness of the frame side portion, which is not conducive to a narrow bezel design and undermines the market competitiveness of products. In addition, through the fastening between the first interference member of the support plate and the first interference portion of the frame, the present application can ensure a firm assembly of the support plate and the frame without being disengaged from each other, thereby creating both the display module structure and the display device with the narrow bezel and secure assembly, which not only improves the product's innovation, but also enhances the product's market competitiveness.

BRIEF DESCRIPTION OF DRAWINGS

In order to better illustrate the technical solutions in the embodiments or in the prior art, the following briefly introduces the accompanying drawings for describing the embodiments. Apparently, the accompanying drawings in the following description show merely some embodiments of the present invention, and a person skilled in the art may still derive other drawings from these accompanying drawings without creative efforts.

DESCRIPTION OF PREFERRED EMBODIMENTS

Figure 1:
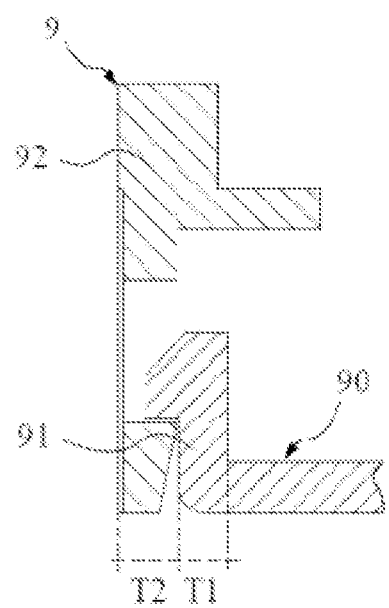
FIG. 1 is a schematic view of a conventional display module.

The following embodiments are referring to the accompanying drawings for exemplifying specific implementable embodiments of the present application. Directional terms described by the present application, such as upper, lower, front, back, left, right, inner, outer, side, etc., are only directions by referring to the accompanying drawings, and thus the used directional terms are used to describe and understand the present invention, but the present application is not limited thereto. In the drawings, units with similar structures are indicated by the same reference numerals. In the drawings, for clear understanding and ease of description, the thickness of some layers and regions are exaggerated. That is, the size and thickness of each component shown in the drawings are arbitrarily shown, but the application is not limited thereto.

An embodiment of the present application provides a display module structure, configured to support and accommodate an optical assembly and to be assembled with a display component. The display component may be a liquid crystal display panel or an organic light-emitting display panel, which may have a touch function. In the embodiment of the present application, the display module structure is a frame structure used in a liquid crystal display panel and can be equipped with an optical assembly to form a backlight module for providing a light source for the liquid crystal display panel.

Figure 2:
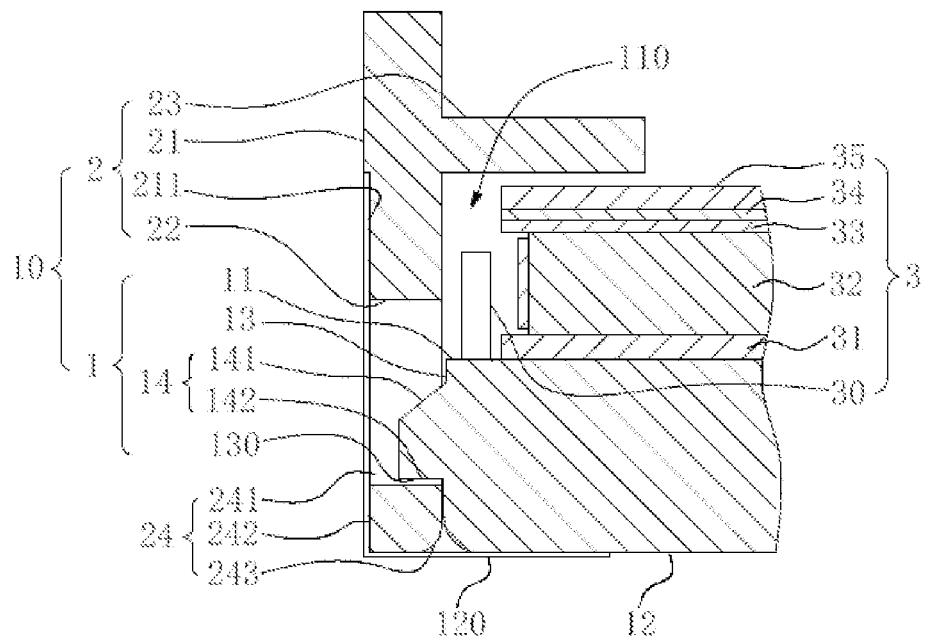
FIG. 2 is a schematic view of a display module structure provided by an embodiment of the present application.

Please refer to FIG. 2. FIG. 2 is a schematic view of a display module structure 10 provided by an embodiment of the present application. It should be noted that since opposite sides of the display module structure are symmetrical structures, FIG. 2 only illustrates one side of the display module structure as an example. As shown in FIG. 2, the display module structure 10 includes a support plate 1 and a frame 2, wherein a material of the support plate 1 is aluminum or aluminum alloy, and the support plate 1 is a cast aluminum having advantages of being light in weight and easy to be casted for configurations as required, but this application is not limited to aluminum castings, and other materials with same properties can also be applied to the support plate. The support plate 1 includes a support surface 11, a bottom surface 12, an interference surface 13 connected between the support surface 11 and the bottom surface 12, and at least a first interference member 14. Specifically, the interference surface 13 is a side surface of the support plate 1, a top edge of the interference surface 13 is connected to one side of the support surface 11, a bottom edge of the interference surface 13 is connected to one side of the bottom surface 12.

As shown in FIG. 2, the support plate 1 further includes a groove 130 recessed from the interference surface 13. The first interference member 14 is disposed on the interference surface 13 and located in the groove 130, wherein a number of the first interference member 14 may be one or more. Specifically, the first interference member 14 and the support plate 1 are integrally formed through a molding process, so that the first interference member 14 protrudes laterally from the interference surface 13. The first interference member 14 includes a guiding surface 141 and an abutting surface 142, wherein the guiding surface 141 shrinks inwardly to form an oblique shape, so as to facilitate a fastening process. In addition, a contour of the first interference member 14 does not exceed the interference surface 13, so that the support plate 1 appears to have a flat side surface at a side viewing angle, thereby improving visual effects. It should be noted that the support surface 11 of the embodiment of the present application is located at a vertical level higher than a vertical level of the first interference member 14. That is, the support surface 11 is located above the guiding surface 141 of the first interference member 14. As shown in FIG. 2, a side portion of the support plate 1 of the present application does not need to be bent to form a fastening structure, and therefore the support surface 11 is directly connected to the interference surface 13, and an optical assembly 3 is arranged on the support surface 11.

As shown in FIG. 2, in the embodiment of the present application, the optical assembly 3 includes a light-emitting device 30 and a reflective film 31, a light guide plate 32, a diffusion sheet 33, a brightness enhancement film 34, and a dual brightness enhancement film 35 sequentially arranged on the support surface 11. In addition, another reflective film may be provided on a side of the light guide plate 32 close to the frame 2. In an embodiment, the light-emitting device 30 may be a light-emitting diode. It should be noted that, in this embodiment, the light-emitting device 30 is an edge-lit light source, but it can also be a direct-lit light source, and the type of the light-emitting device is not limited in this application.

Figure 3:
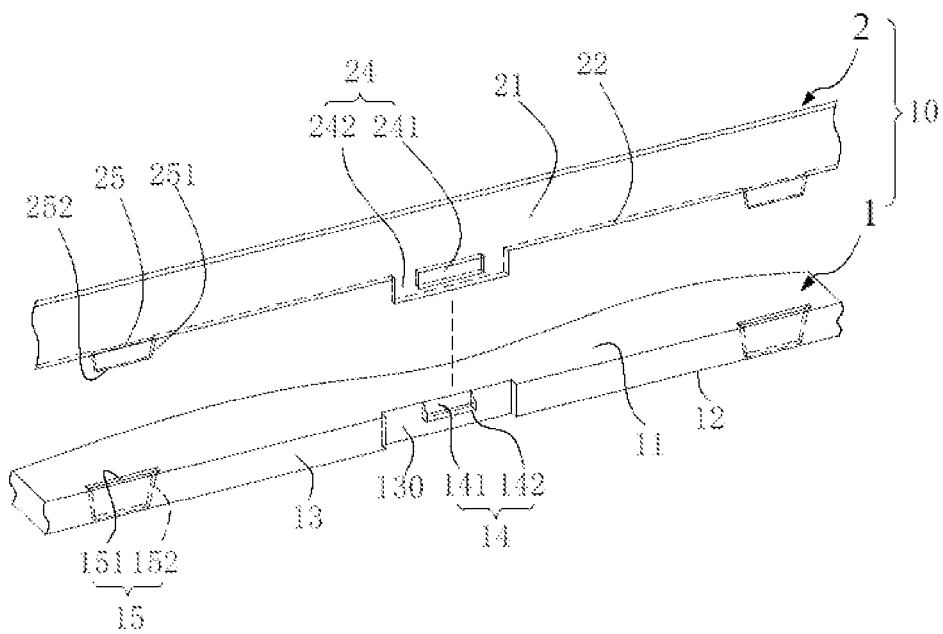
FIG. 3 is a schematic perspective structural view of the display module structure of FIG. 2.

Continuing referring to FIG. 2, the frame 2 is thin in shape and can be made of plastic; that is, the frame 2 is a plastic frame. The frame 2 includes a retaining wall 21, a bottom edge 22 of the retaining wall 21, and at least one first interference portion 24 provided on the retaining wall 21. The retaining wall 21 is arranged around the support plate 1 so that the support plate 1 can be fixed in the space framed by the frame 2. The first interference portion 24 is disposed corresponding to the first interference member 14 and is integrally formed on the bottom edge 22 of the retaining wall 21 extending in a direction toward the first interference member 14. Please refer to FIG. 3, which is a schematic perspective structural view of the display module structure of FIG. 2. As shown in FIG. 3, the first interference portion 24 is sheet-like in shape and includes a fastening slot 241 and a limiting wall 242 surrounding the fastening slot 241, wherein the limiting wall 242 is U-like in shape, and a width between opposite ends of the limiting wall 242 is equal to or less than a width of the groove 130, so that the fastening slot 241 can fit into the groove 130. Specifically, the limiting wall 242 includes a guiding edge 243 disposed at a corner of the limiting wall 242 close to the groove 130, wherein the guiding edge 243 is an oblique surface or a curved surface.

Continuing referring to FIG. 3, in assembling the support plate 1 and the frame 2 of the present application, the guiding edge 243 of the first interference portion 24 is in contact with the guiding surface 141 of the first interference member 14 and travels downward and smoothly with the guiding of the guiding surface 141, so that the fastening slot 241 is fastened with the first interference member 14 (as shown in FIG. 2); at this time, the abutting surface 142 of the first interference member 14 abuts against the limiting wall 242 below the slot 241, and the first interference member 14 is surrounded by the limiting wall 242 so as to complete the fastening between the first interference member 14 and the first interference portion 24. In addition, when the first interference member 14 and the first interference portion 24 after being fastened are viewed at a side viewing angle, the outer surface of the limiting wall 242 is located in the groove 130 so that the display module structure 10 is flat on a side portion, thereby improving visual effects. It should be noted that after the support plate 1 and the frame 2 are assembled, the bottom edge 22 of the retaining wall 21 abuts against the support surface 11 of the support plate 1 and forms an accommodating space 110 with the support surface 11 (as shown in FIG. 2). In this way, the optical assembly 3 is arranged inside the accommodating space 110.

As shown in FIG. 2, in the present application, by providing the first interference member 14 formed on the interference surface 13 (i.e., a side surface) of the support plate 1, and by providing the support surface 11 located above the first interference member 14 through an aluminum casting process, the support plate 1 does not need to be bent to form the first interference member 14 for being fastened with the first interference portion 24 of the frame 2, so that the support surface 11 is in direct contact with the frame 2, thereby solving a problem that a frame side portion of a traditional display module is composed of a two-layered structure, resulting in an increase in a thickness of the frame side portion, which is not conducive to a narrow bezel design. Furthermore, by the abutting surface 142 of the first interference member 14 abutting against the limiting wall 242 below the fastening slot 241 of the first interference portion 24, the frame 2 can be limited in a longitudinal direction; by the arrangement of the U-shaped limiting wall 242 of the first interference portion 24 to surround the first interference member 14, and the limiting wall 242 located in the groove 130 of the support plate 1, the frame 2 can be limited in a transverse direction. In this fashion, the present application can ensure that the support plate 1 and the frame 2 are assembled stably and will not fall off, thereby creating the display module structure 10 with a narrow bezel and a stable assembly.

Continuing referring to FIG. 2, in an embodiment of the present application, the display module structure 10 further includes a bound edge adhesive 120, which may be an adhesive tape. A recessed portion 211 is disposed on an outer surface of the frame 2 corresponding to the first interference portion 24. The bound edge adhesive 120 is arranged along the recessed portion 211 and extends to the bottom surface 12 of the support plate 1, so that the first interference member 14 and the first interference portion 24 are covered by the bound edge adhesive 120, thereby preventing light leakage and dust intrusion. Due to the disposition of the recessed portion 211, the flatness of the side portion of the frame 2 will not be affected by the bound edge adhesive 120, so that uneven side surface will not be caused, thereby improving the visual effects. In another embodiment, the bound edge adhesive 120 can also be applied along the entire outer surface of the retaining wall 21 of the frame 2 to achieve better light leakage and dust prevention effects.

Please continue referring to FIG. 3. The support plate 1 further includes at least a second interference member 15, which is spaced apart from the first interference member 14 and located directly below the bottom edge 22 of the retaining wall 21. The frame 2 further includes at least a second interference portion 25, which is disposed on the retaining wall 21 and extends in a direction toward the second interference member 15. Specifically, the second interference portion 25 is sheet-like in shape and includes two fitting walls 251 that taper toward the bottom, so that the second interference portion 25 forms an inverted trapezoid shape. The second interference member 15 is disposed corresponding to the second interference portion 25 and includes an insertion slot 151. The insertion slot 151 faces the bottom edge 22 of the retaining wall 21, penetrates the support surface 11 of the support plate 1, and includes two opposite interfering inner walls 152. As shown in FIG. 3, the second interference portion 25 is insertable to the second interference member 15, wherein the fitting walls 251 are engaged with the interfering inner walls 152. The combination of the support plate 1 and the frame 2 can be strengthened by a snug fit between the second interference portion 25 and the second interference member 15, and the frame 2 can be further limited in the transverse direction, thereby improving supporting performance of the display module structure 10.

Figure 4:
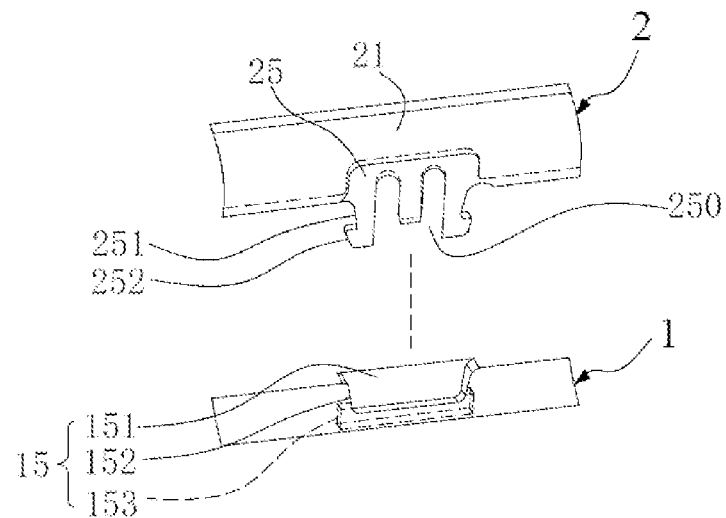
FIG. 4 is a schematic perspective structural view of a display module structure provided by another embodiment of the present application.
Figure 5:
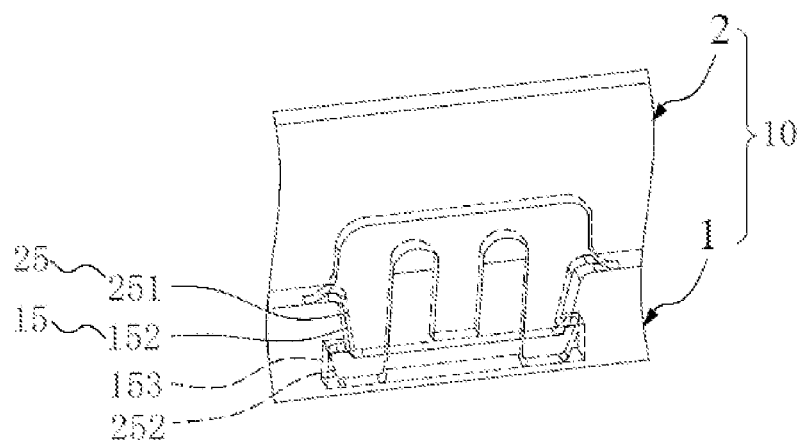
FIG. 5 is a schematic perspective assembly view of the display module structure of FIG. 4.

Please refer to FIGS. 4 and 5. FIG. 4 is a schematic perspective structural view of the display module structure 10 provided by another embodiment of the present application. FIG. 5 is a schematic perspective assembly view of the display module structure 10 of FIG. 4. The main difference between this embodiment and the foregoing embodiment is that an extension slot 153 is further disposed at a bottom of the insertion slot 151, and both ends of the extension slot 153 extend outside the interfering inner walls 152, respectively. In addition, each of the fitting walls 251 is provided with a hook 252 corresponding to the extension slot 153 to be fastened in the extension slot 153. In particular, there is a gap 250 between the two fitting walls 251. When the fitting walls 251 are inserted into the insertion slot 151, because the two interfering inner walls 152 taper to cause a decrease in a width of the insertion slot 151, the fitting walls 251 are thus compressed by the interfering inner walls 152, and the gap 250 serves to provide space for compression of the interfering inner walls 152 (as shown in FIG. 5)

As described above, through the fastening between the second interference member 15 and the second interference portion 25, the present application can further ensure that the support plate 1 and the frame 2 are assembled firmly, and can effectively prevent the frame 2 from overturning.

Figure 6:
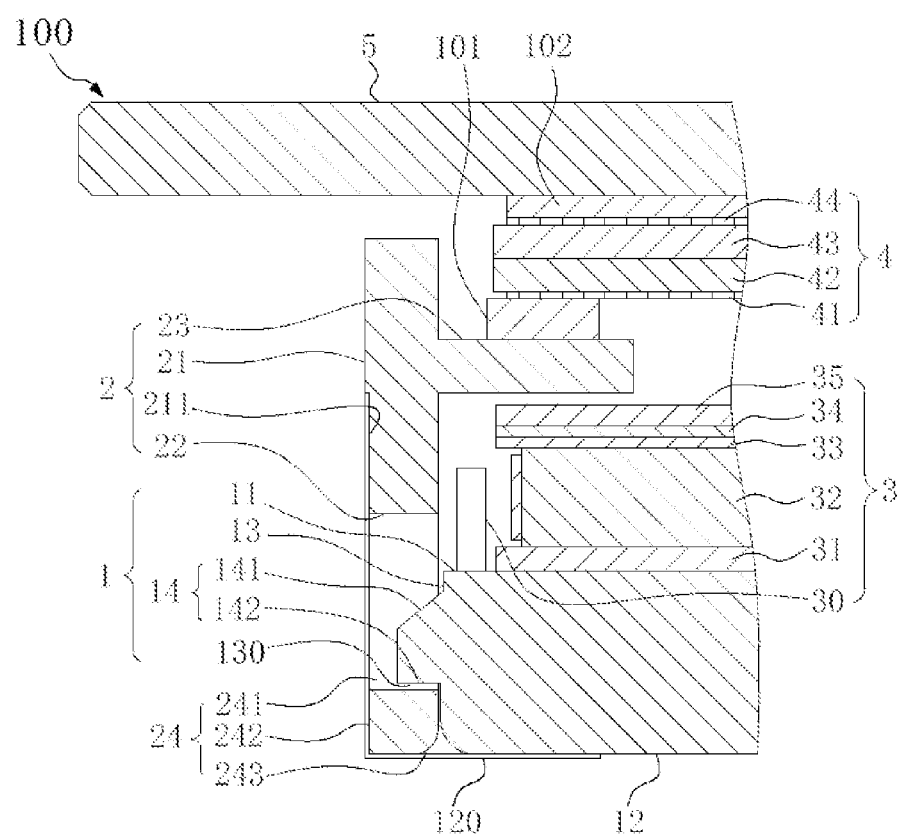
FIG. 6 is a schematic structural view of a display device provided by an embodiment of the present application.

Please refer to FIG. 6, which is a schematic structural view of a display device 100 provided by an embodiment of the present application. As shown in FIG. 6, the present application further provides the display device 100, including a liquid crystal display panel 4 and the display module structure 10 of the above-mentioned embodiment. In this embodiment, a cantilever 23 is disposed on one side of the retaining wall 21 facing the optical assembly 3 for supporting the liquid crystal display panel 4, and the optical assembly 3 is arranged between the cantilever 23 and the support surface 11. Particularly, the cantilever 23 is parallel with the support surface 11. Since the support plate 1 of the present application does not need to be bent on a side portion of support plate 1, an orthographic projection of the cantilever 23 on a horizontal plane is completely located on the support surface 11, thereby increasing the space for placing the optical assembly. Specifically, a side of the cantilever 23 away from the support plate 1 is provided with a foam 101, which can cushion the impact of the liquid crystal display panel 4 from an external force. In this embodiment, a structure of the liquid crystal display panel 4 is the same as that of a general liquid crystal display panel; specifically, the liquid crystal display panel 4 includes a lower polarizer 41, an array substrate 42, a color filter substrate 43, and an upper polarizer 44 disposed in order from bottom to top. In addition, the upper polarizer 44 is provided with an optical clear adhesive 102 for adhering a transparent cover 5. The optical assembly 3 of the present application is used to provide the light source required by the liquid crystal display panel 4. Particularly, since the support surface 11 of the present application is located at the vertical level higher than the vertical level of the first interference member 14, the optical assembly 13 is thus placed closer to the liquid crystal display panel 4. Therefore, the light source emitted by the light-emitting device 30 is closer to the liquid crystal display panel 4, thereby increasing the display brightness and improving the display effect.

Accordingly, this application provides the display module structure and the display device. In the display module structure, by providing the first interference member formed on the interference surface (i.e., a side surface) of the support plate, and by providing the support surface located above the first interference member through the aluminum casting process, the support plate does not need to be bent to form the first interference member for being fastened with the first interference portion of the frame, so that the support surface is in direct contact with the frame, thereby solving the problem that a frame side portion of a traditional display module is composed of a two-layered structure, resulting in an increase in a thickness of the frame side portion, which is not conducive to a narrow bezel design and undermines the market competitiveness of products. In addition, through the fastening between the first interference member of the support plate and the first interference portion of the frame, the present application can ensure a firm assembly of the support plate and the frame without being disengaged from each other, thereby creating both the display module structure and the display device with the narrow bezel and secure assembly, which not only improves the product's innovation, but also enhances the product's market competitiveness.

In the above-mentioned embodiments, the description of each embodiment has its own emphasis. For parts that are not described in detail in an embodiment, reference may be made to related descriptions of other embodiments.

The above describes the embodiments of the present application in detail. The descriptions of the above embodiments are only used to help understand the technical solutions and kernel ideas of the present disclosure; those of ordinary skill in the art should understand that they can still modify the technical solutions described in the foregoing embodiments, whereas these modifications or substitutions do not deviate the essence of the corresponding technical solutions from the scope of the technical solutions of the embodiments of the present disclosure.

What is claimed is:

1. A display module structure, configured to support an optical assembly, comprising:
a support plate comprising a support surface, a bottom surface, an interference surface connected between the support surface and the bottom surface, a groove, and at least one first interference member, wherein the support surface is configured for disposition of the optical assembly, the first interference member is disposed on the interference surface, and the support surface is located at a vertical level higher than a vertical level of the first interference member; the groove is recessed from the interference surface, and the first interference member is located in the groove and protrudes out of the interference surface; and a frame comprising a retaining wall and at least a first interference portion arranged on the retaining wall, the retaining wall disposed around the support plate, the first interference portion of the frame is located at a bottom edge of the retaining wall and extends in a direction toward the first interference member and comprises a fastening slot and a limiting wall surrounding the fastening slot, the fastening slot engages with the first interference member; an outer surface of the limiting wall is located in the groove, a width between opposite ends of the limiting wall is equal to a width of the groove, the limiting wall comprises a guiding edge disposed at a corner of the limiting wall close to the interference surface, wherein the guiding edge is an inclined surface or a curved surface; an abutting surface of the first interference member abuts against the limiting wall below the fastening slot, and the first interference member is surrounded by the limiting wall, so as to complete fastening between the first interference portion and the first interference member to fix the frame to the support plate.

2. The display module structure of claim 1, wherein the support plate further comprises at least a second interference member spaced apart from the first interference member and located under the bottom edge of the retaining wall, and the frame further comprises at least a second interference portion arranged on the retaining wall and fastened with the second interference member.

3. The display module structure of claim 2, wherein the second interference member comprises an insertion slot, and the second interference portion is disposed on the bottom edge of the retaining wall and extends in a direction toward the second interference member, wherein the insertion slot penetrates the support surface of the support plate and comprises two opposite interfering inner walls, and the second interference portion is provided with fitting walls corresponding to and engaging with the interfering inner walls.

4. The display module structure of claim 3, wherein an extension slot is disposed at a bottom of the insertion slot, and both ends of the extension slot extend outside the interfering inner walls, respectively, wherein each of the fitting walls is provided with a hook corresponding to the extension slot to be fastened in the extension slot.

5. The display module structure of claim 1, further comprising a bound edge adhesive, wherein a recessed portion is disposed on an outer surface of the frame corresponding to the first interference portion, and the bound edge adhesive is arranged along the recessed portion and extends to a bottom surface of the support plate, so that the first interference member and the first interference portion are covered by the bound edge adhesive.

6. The display module structure of claim 1, wherein a cantilever is disposed on one side of the retaining wall facing the optical assembly and is parallel with the support surface, and an orthographic projection of the cantilever on a horizontal plane is completely located on the support surface, wherein the optical assembly is arranged between the cantilever and the support surface.

7. The display module structure of claim 1, wherein the bottom edge of the retaining wall of the frame abuts against the support surface of the support plate and forms an accommodating space with the support surface, and the optical assembly is disposed in the accommodating space, wherein the optical assembly comprises a light-emitting device.

8. A display device, comprising a liquid crystal display panel and a display module structure, the display module structure configured to support an optical assembly, the optical assembly comprising a light-emitting device for providing a light source for the liquid crystal display panel, wherein the display module structure comprises:
a support plate comprising a support surface, a bottom surface, an interference surface connected between the support surface and the bottom surface, a groove, and at least one first interference member, wherein the support surface is configured for disposition of the optical assembly, the first interference member is disposed on the interference surface, and the support surface is located at a vertical level higher than a vertical level of the first interference member; the groove is recessed from the interference surface, and the first interference member is located in the groove and protrudes out of the interference surface; and
a frame comprising a retaining wall and at least a first interference portion arranged on the retaining wall, the retaining wall disposed around the support plate, the first interference portion of the frame is located at a bottom edge of the retaining wall and extends in a direction toward the first interference member and comprises a fastening slot and a limiting wall surrounding the fastening slot, the fastening slot engages with the first interference member, an outer surface of the limiting wall is located in the groove, a width between opposite ends of the limiting wall is equal to a width of the groove, the limiting wall comprises a guiding edge disposed at a corner of the limiting wall close to the interference surface, wherein the guiding edge is an inclined surface or a curved surface, an abutting surface of the first interference member abuts against the limiting wall below the fastening slot, and the first interference member is surrounded by the limiting wall, so as to complete fastening between the first interference portion and the first interference member to fix the frame to the support plate.

9. The display device of claim 8, wherein the support plate further comprises at least a second interference member spaced apart from the first interference member and located under the bottom edge of the retaining wall, and the frame further comprises at least a second interference portion arranged on the retaining wall and fastened with the second interference member.

10. The display device of claim 9, wherein the second interference member comprises an insertion slot, and the second interference portion is disposed on the bottom edge of the retaining wall and extends in a direction toward the second interference member, wherein the insertion slot penetrates the support surface of the support plate and comprises two opposite interfering inner walls, and the second interference portion is provided with fitting walls corresponding to and engaging with the interfering inner walls.

11. The display device of claim 10, wherein an extension slot is disposed at a bottom of the insertion slot, and both ends of the extension slot extend outside the interfering inner walls, respectively, wherein each of the fitting walls is provided with a hook corresponding to the extension slot to be fastened in the extension slot.

12. The display device of claim 8, further comprising a bound edge adhesive, wherein a recessed portion is disposed on an outer surface of the frame corresponding to the first interference portion, and the bound edge adhesive is arranged along the recessed portion and extends to a bottom surface of the support plate, so that the first interference member and the first interference portion are covered by the bound edge adhesive.

13. The display device of claim 8, wherein a cantilever is disposed on one side of the retaining wall facing the optical assembly and is parallel with the support surface, and an orthographic projection of the cantilever on a horizontal plane is completely located on the support surface, wherein the optical assembly is arranged between the cantilever and the support surface.

14. The display device of claim 8, wherein the bottom edge of the retaining wall of the frame abuts against the support surface of the support plate and forms an accommodating space with the support surface, and the optical assembly is disposed in the accommodating space, wherein the optical assembly comprises a light-emitting device.

* * * * *